Nov. 18, 1941.  C. H. WESTCOTT  2,263,150
DOWEL BAR BEARING AND SUPPORT
Filed Aug. 8, 1938
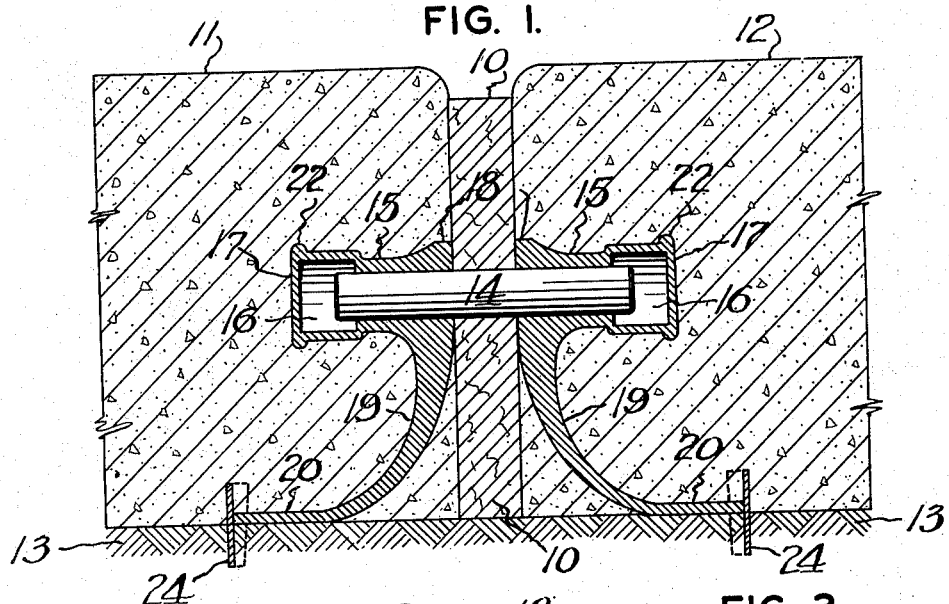
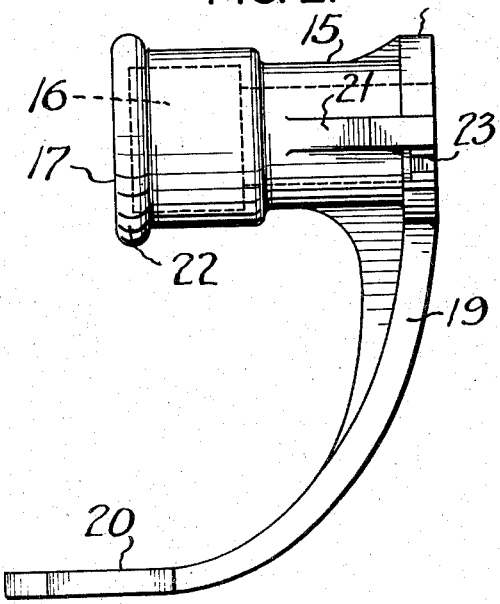
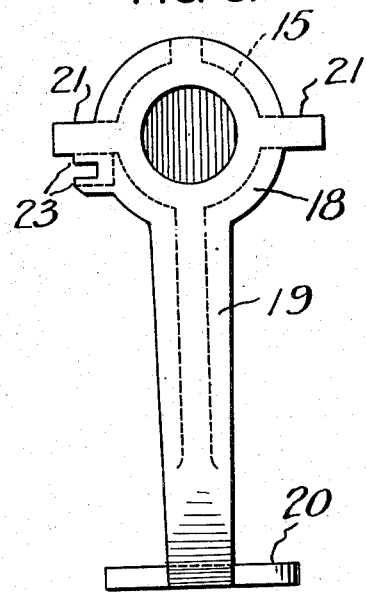
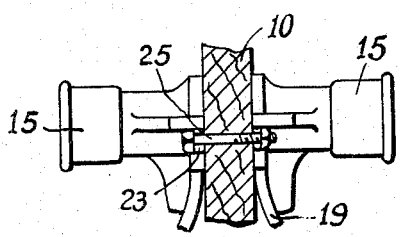
INVENTOR.
CLIFFORD H. WESTCOTT.
BY
HIS ATTORNEY.

Patented Nov. 18, 1941

2,263,150

UNITED STATES PATENT OFFICE 2,263,150

DOWEL BAR BEARING AND SUPPORT

Clifford H. Westcott, Oak Park, Ill., assignor to James H. Jacobson, Chicago, Ill.

Application August 8, 1938, Serial No. 223,576

6 Claims. (Cl. 94—8)

My present invention relates to the construction of bridges, masonry and concrete structures, and particularly to the building of highways and concrete pavements, and more particularly to a dowel bar and its bearing, the dowel bridging the space between and structurally connecting the adjoining end faces of adjacent concrete slabs, transferring road loads from one concrete slab to the next adjoining slab.

This is a continuation-in-part of my copending application Serial No. 22,308, filed May 20, 1935.

The primary objects of my present invention are to maintain the surface of the adjoining slabs uniform and in substantially the same plane so as to obtain a comparatively smooth and uninterrupted surface for the motoring public;

To reduce the high bearing stresses existing at the edge of the slab by providing a greater bearing area in contact with the concrete at the edge of the slab;

To further reduce the high edge stresses by virtue of radiating anchors or fins which either absorb load or transmit and distribute the dowel loads to and within the slab and thereby eliminate high stress areas in the slab that would otherwise exist;

To provide a shorter effective length of structural dowel member whereby the deflection of the dowel is materially reduced;

To decrease the deflection of the short dowel during periods of load transmission by furnishing a definite structural support for the body of the dowel, which not only eliminates channeling within the slab, but by so doing, also decreases deflection under periods of load transmission;

To increase the load transmission capacity of the common dowel, as a dowel used for the purpose of load transmission is required to withstand bending and shearing stresses, and I materially reduce these bending stresses in a dowel by effectively reducing the length of the bar;

To increase the load transmission capacity of the dowel by virtue of this reduction in length with the consequent increased capacity in bending. Due to this shorter length and consequent smaller deflection the load transfer capacity of the dowel is considerably increased, the amount of increase depending upon the thickness of the slab and the modulus of the subgrade reaction;

To provide a load transmission device which will serve as a chair, or support, to position the dowel in proper alignment, and which structure rests directly upon the subgrade and thereby supports the dowel in actual alignment parallel to the surface of the subgrade and parallel to the surface of the highway. I provide accessible means for providing and maintaining proper alignment of the dowel; and To obtain an air space at the end of the short dowel so that the dowel may move freely to accommodate the movement of the adjoining slabs during periods of volume change.

My present invention has these and other objects, all of which are explained in detail and may be more readily understood when read in conjunction with the accompanying drawing (one sheet), which illustrates the preferred embodiment of my invention, it being manifest that changes and modifications may be resorted to without departure from the spirit of the claims forming a part hereof.

In the drawing:

Fig. 1 is a section through an expansion joint positioned between the end faces of adjoining slab sections embodying my invention, the dowel being shown in elevation;

Fig. 2 is an elevation of one member of the dowel bearing;

Fig. 3 is an end elevation of Fig. 2; and

Fig. 4 is a fragmentary elevational view of the assembled units illustrating the temporary locking means engaging both units.

Similar reference characters refer to similar parts throughout the several views.

The structure illustrated involves the application of my invention to a roadway slab, and for purpose of description only, I choose to define my invention as applied to this particular construction; however, I wish it understood that its adoption and use are equally applicable to any poured or pre-cast structure, whether it be a roadway slab or a retaining wall, dam, or building structure, for, as a matter of fact, they are applicable to an almost unlimited number of structures.

For purpose of illustration, I have shown a conventional type of expansion joint comprising a strip of preformed yieldable material, resilient in character and designated by the reference numeral 10, positioned between and abutting the adjoining end faces of adjacent concrete slabs 11 and 12, which are shown resting upon the subgrade 13; and whereas I have shown and described such form of joint, I wish it understood that any type or construction of joint may be employed in association with my invention, whether it be an expansion joint, contraction joint, or a construction joint.

My invention consists in spanning the space (or joint) between the slabs 11 and 12 with a relatively short dowel bar 14 positioned at substantially mid-depth of the slabs and parallel with the top surface thereof and normal to the plane of the joint; and whereas I have shown the dowel as the common rolled bar of circular cross-section, it will be apparent to those skilled in the art that dowels of various cross-sections may be employed.

The ends of the dowel 14 are telescoped into a pair of cylindrical bearing sleeves 15—15, symmetrically positioned one on each side of the joint 10, and adapted to be cast into their respective slabs as shown. Each sleeve is reamed to provide a snug and tight sliding fit for the dowel and of a length sufficient to provide an air chamber 16 of a depth equivalent to at least one-half of the joint 10 (or space) between the adjoining slabs. The outer ends of the sleeves are sealed with a wall 17, whereas the inner faces are reinforced with an enlarged bearing or fin 18, which is positioned approximately flush with the face of the respective slab sections. A radial leg or bracket 19 is cast integral with the fin 18 and the sleeve 15 and diverges therefrom back into the slab terminating in a foot section 20, which is adapted to rest directly upon the subgrade 13, and serve not only as a load distributing member, but also as a support for the assembly prior to the pouring of the concrete. And lateral fins 21 are provided, which likewise radiate from the bearing ring 15 and taper back to a point approaching the wall 17, thereby increasing the bearing surface at the face of the slab, and providing also for load distribution into the body of the slab. In addition to the reinforcing fin or enlarged bearing 18 which is located flush with the face of the slab as described, it is my purpose to provide additional like reinforcing fins 22, preferably located at the opposite end of the bearing sleeve 15, which function as a means for anchoring the bearing into the slab and also serve as additional means for either picking up or distributing the load within the body of the slab. The radial fins or bearing rings 18, 21 and 22 are shown and described placed at the extreme ends of the bearing sleeve 15, but I wish it understood that these fins may be located at any point on the bearing 15, and may be either increased or decreased in number without departing from the spirit of my invention.

In the assembly of the dowel bar bearing and support, the dowel 14 is first passed through the joint with equal lengths protruding on each side thereof, the bearing sleeves 15 are next placed over the protruding ends of the dowel as shown, and then temporarily held in place by means of a bolt 25 which is passed through the joint and the aligned bifurcated projections 23 which protrude from the ring 18. The dowel structure just defined is assembled at intervals throughout the length of the mechanical joint, and at the desired spacing to accommodate the estimated loads the pavement is to carry. The entire structure, including the dowel assembly and the joint, is then placed upon the subgrade, the member 20 resting directly upon the subgrade and being staked in place with a conventional stake pin 24, and due to this particular assembly, the dowels are maintained in proper alignment, the joint is held in place and the slabs are then poured, cured, and the highway opened to traffic and the resultant application of moving wheel loads.

In operation and as the moving wheel load approaches the joint traveling from the initially loaded slab towards the next adjacent slab, the load is absorbed by the dowel bar bearing and particularly the radial arm 19 and fins 18 and 22, and then transmitted to the sleeve 15 and dowel 14 and thence across the joint to a like unit on the opposite side in the next adjacent slab, where the concentrated load is dissipated through the sleeve and the radial arms and fins and distributed into the slab structure. As the load crosses the joint and onto the next adjacent slab, the reverse of the above action starts at a maximum and diminishes as the load passes on. The short dowel remains at all times at or near the neutral axis of the slabs, whereas the radial flanges or fins remain within the tension and compression areas intersecting the shear planes and reinforcing the edge of the slab. This action of the dowel structure absorbs and so distributes the load, that if failure occurs, it will take place outside of the field embraced by the dowel bar structure, thus effectively transmitting the full strength of one slab to the other without interruption; in fact, the employment of this structure insures the highway against joint failures, as the slab here, is stronger at the joint than at any other point. The fins 18 and 21 increase the bearing value of the sleeve 15 in the concrete and assist in the distribution of load to such an extent as to prevent channeling of the concrete structure.

The foregoing discussion and illustrations have applied in general to poured concrete—cast in situ; but pre-cast concrete, art marble, imitation stone, glass, terra cotta, and many similar products are gaining favor in the building industry of today. Many times these preferred products would be used in places where they are not now used if it were possible to effectively transmit a load from one to the next adjoining section. My invention is equally applicable to such or similar fields of work.

What I claim as new and desire to secure by Letters Patent is:

1. A load transfer device for bridging a gap between the adjacent end faces of two substantially horizontally aligned concrete slabs comprising a relatively rigid bearing member and an associated bridging member, said bearing member consisting of a unitary article having its component parts adapted to be imbedded in one of the two slabs and comprising a sleeve portion opening at the end face of the slab in which that member is imbedded and having the axis of its bore horizontal and substantially at right angles to said slab end and approximately within the neutral plane of the slab, an integral anchor portion extending outwardly from the outer wall of the sleeve portion of said bearing member and adapted to enter into the body of the slab within which said bearing member is imbedded, and an integral stool portion extending downwardly from the outer wall of the sleeve portion of said bearing member formed to provide a support therefore prior to and during the pouring of said slabs, said bridging members seating within and slidably engaging the bore of the sleeve portion of said bearing member and projecting beyond the end face thereof and to bridge the gap intervening between the end face of the slab in which it is supported and the opposite or opposed slab.

2. A load transfer device as per claim 1 in which the integral stool portion which is formed to provide a support for the bearing member, extends downwardly therefrom in substantially the same vertical plane within which lies the bridging member, and wherein a portion of said stool is provided with lateral extensions to provide a foot portion adapted to rest upon the subgrade supporting said slabs.

3. A load transfer device as per claim 1 which includes a second bearing member similar to said first-named bearing member, engaging and partially enclosing the opposite end portion of the bridging member.

4. A load transfer device as per claim 1 which includes a second bearing member similar to said first named bearing member engaging and partially enclosing the opposite end portion of the said bridging member, and further including a locking member engaged with said bearing members to prevent the premature separation of the assembled device.

5. A load transfer device as per claim 1 wherein the enclosed portion of the bridging member is less in length than that of the length of the bore of the related sleeve portion of the bearing member to thereby establish the air space at one end of the bridging member.

6. A load transfer device for bridging a gap between the adjacent end faces of two substantially horizontally aligned concrete slabs comprising two counterpart and relatively reversed rigid bearing members and an associated bridging member, each bearing member consisting of a single unitary article having its component parts adapted to be imbedded in its respective slab and comprising a sleeve portion opening at the end face of its related slab in which that member is imbedded and having the axis of its bore horizontal and substantially at right angles to said slab end and approximately within the neutral plane of the slab, an integral anchor portion extending outwardly from the outer wall of the sleeve portion and adapted to enter into the body of its related slab, and an integral stool portion extending downwardly from the outer wall of the sleeve portion and formed to provide a support therefor prior to and during the pouring of said slabs, portions of said bridging member seating within and have bearing in each of said bearing members.

CLIFFORD H. WESTCOTT.